US012043279B2

(12) United States Patent
Conroy et al.

(10) Patent No.: US 12,043,279 B2
(45) Date of Patent: Jul. 23, 2024

(54) ALGORITHMS FOR OPTIMIZING UTILIZATION

(71) Applicant: Ford Global Technologies, LLC, Dearborn, MI (US)

(72) Inventors: Don Conroy, Grosse Ile, MI (US); Sarah Klein, Royal Oak, MI (US); Hyongju Park, Ann Arbor, MI (US); Jacqueline Smith, Ferndale, MI (US); Sophia Dancel, Rochester Hills, MI (US)

(73) Assignee: Ford Global Technologies, LLC, Dearborn, MI (US)

( * ) Notice: Subject to any disclaimer, the term of this patent is extended or adjusted under 35 U.S.C. 154(b) by 179 days.

(21) Appl. No.: 17/493,220

(22) Filed: Oct. 4, 2021

(65) Prior Publication Data

US 2023/0114638 A1    Apr. 13, 2023

(51) Int. Cl.
*B60W 60/00* (2020.01)
*G01C 21/34* (2006.01)
*G01C 21/36* (2006.01)

(52) U.S. Cl.
CPC ....... *B60W 60/001* (2020.02); *G01C 21/3438* (2013.01); *G01C 21/3461* (2013.01); *G01C 21/3605* (2013.01); *B60W 2552/53* (2020.02); *B60W 2554/4045* (2020.02)

(58) Field of Classification Search
None
See application file for complete search history.

(56) References Cited

U.S. PATENT DOCUMENTS

| 7,979,173 | B2 | 7/2011 | Breed |
| 8,352,112 | B2 | 1/2013 | Mudalige |
| 9,557,183 | B1 | 1/2017 | Ross et al. |
| 10,832,570 | B1 | 11/2020 | Ibrahim et al. |
| 2018/0113463 | A1* | 4/2018 | Iagnemma ........... G06Q 10/047 |
| 2018/0174449 | A1* | 6/2018 | Nguyen ............... G08G 1/0104 |
| 2019/0066409 | A1* | 2/2019 | Moreira da Mota ....................... G07C 5/0808 |
| 2019/0385446 | A1* | 12/2019 | Lepp .................... G08G 1/0145 |

(Continued)

OTHER PUBLICATIONS

B.V. Meldert, et al. "Introducing Autonomous Vehicles in Logistics: a Review From a Broad Perspective" (2016).

*Primary Examiner* — Tuan C To
*Assistant Examiner* — David Ruben Pedersen
(74) *Attorney, Agent, or Firm* — Emily Drake; Eversheds Sutherland (US) LLP

(57) ABSTRACT

A cloud service receives locations of priority vehicles (PVs) and non-priority vehicles in a metropolitan area. The cloud service accesses a database storing indicia of restricted road portions in the metropolitan area. The cloud service allocates restricted road portions from the database to the NPVs based on the locations of the PVs, the locations of the NPVs, and locations of the restricted road portions. The allocating includes preventing some of the restricted road portions in the database from being available to be allocated to the NPVs based on determining, according to the locations of the PVs and NPVs and according to pre-stored routes of the PVs, that estimated uses of the road portions by the NPVs would conflict with estimated uses of the road portions by the PVs as they travel along the pre-stored routes. Routes generated to include the respectively allocated road portions are provided to the NPVs.

17 Claims, 9 Drawing Sheets

(56) References Cited

U.S. PATENT DOCUMENTS

2020/0317223 A1* 10/2020 Kovacek .............. G06Q 20/085
2021/0107476 A1* 4/2021 Cui ................. B60W 60/00276

* cited by examiner

ALGORITHMS FOR OPTIMIZING UTILIZATION

BACKGROUND

Autonomous vehicles (AVs) and ridesharing services provide convenient transportation within urban regions. These forms of transportation are becoming more available, and demand is increasing. One survey in the United States revealed that the portion of the population using ridesharing services more than doubled from 2015 (15%) to 2018 (36%). However, there is data suggesting that overall road incidents may have increased slightly due to unsafe locations for picking up and dropping off passengers. The same problem arises with both AV ridesharing services and manually-driven ridesharing services. In addition, traffic continues to increase in many urban areas. At the same time, cities and metropolitan regions have road infrastructure whose use may be off-limits to AVs and ridesharing services. Some examples of restricted-use road infrastructure include bus stops, high-occupancy vehicle (HOV) lanes, bus lanes, freeway ramp queue bypasses, areas reserved for fire and police, fire hydrant zones, smart traffic lights, airport shuttle zones, toll lanes, business and transit lanes, loading zones, and so forth. Unauthorized use of most these types of restricted-use infrastructure is usually penalized. Notably, a significant portion of restricted-use infrastructure has low utilization; at any given time, a piece of restricted-use infrastructure is often unused and vacant. Even at busy times, a bus often only dwells at a bus stop for 30 seconds to a minute, depending on the number of passengers loading and unloading. Bus stop road pads, often upward of 100 feet, are unused most of the time.

BRIEF DESCRIPTION OF THE DRAWINGS

The present description will be better understood from the following detailed description read in light of the accompanying drawings, wherein like reference numerals are used to designate like parts in the accompanying description.

DETAILED DESCRIPTION

Overview

Figure 1:
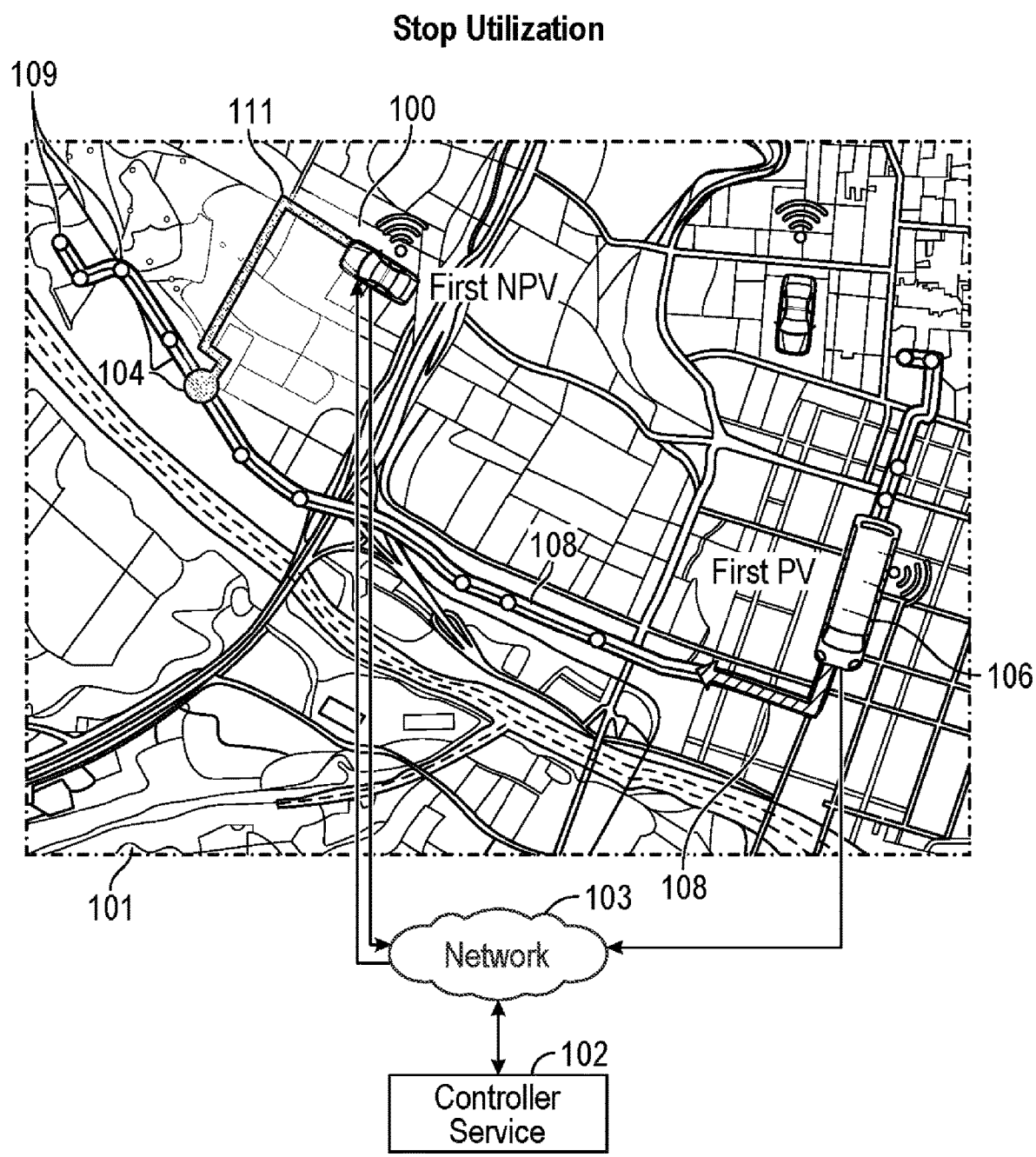
FIG. 1 shows an example of a stop utilization scenario in accordance with one or more embodiments of the disclosure.

An embodiment for improving utilization of stops and lanes may include a cloud service that receives locations of priority vehicles (PVs) and non-priority vehicles in a metropolitan area. The cloud service accesses a database storing indicia of restricted road portions in the metropolitan area. The cloud service allocates restricted road portions from the database to the non-PVs (NPVs) based on the locations of the PVs, the locations of the NPVs, and locations of the restricted road portions. The allocating includes preventing some of the restricted road portions in the database from being available to be allocated to the NPVs based on determining, according to the locations of the PVs and NPVs and according to pre-stored routes of the PVs, that estimated uses of the road portions by the NPVs would conflict with estimated uses of the road portions by the PVs as they travel along the pre-stored routes. Routes generated to include the respectively allocated road portions are provided to the NPVs.

Embodiments

Before describing the embodiments, some terminology will be set forth. Two types of vehicles will be discussed herein; priority vehicles (PVs) and non-priority vehicles (NPVs). From a system point of view, these vehicle types are a matter of convention; any vehicle can be deemed a PV or an NPV. For example, PVs and NPVs may be either manually operated vehicles or autonomous vehicles (AVs). A vehicle's type (PV or NPV) relates to how it is handled by the embodiments described herein. As used herein, the term "PV" refers to vehicles that the embodiments treat as having priority over NPVs for using restricted stops and restricted lanes, and the predicted locations of PVs will control how the embodiments allocate access to restricted lanes and stops to NPVs. While in practice a PV may be any vehicle, a PV may typically be a bus, an emergency vehicle, a utility or garbage truck, a police vehicle, an ambulance, or the like. PVs will often be vehicles accorded special status by a local rule and may have privileges to use restricted lanes or stops.

As used herein, the term "NPV" refers to any vehicle that is not a PV. That is, an NPV is any vehicle that the embodiments do not manage as having priority or privileged use of restricted lanes or stops. The embodiments allocate access (and provide routes) to NPVs based on the predicted locations of PVs. While NPVs may be fully autonomous vehicles, they may also be manually driven vehicles or ridesharing vehicles, fleet vehicles, delivery vehicles, etc. Both the NPV's and PV's may be engaged in the delivery of goods/items and/or people.

As used herein, depending on context, the terms "restricted stop" and "restricted lane" refer to portions of road or road-accessible surface that the embodiments treat as having priority for PVs over NPVs, or they refer to areas of a road network (digital map) used by the embodiments. In either sense, a "restricted stop" corresponds to a portion of road or road-accessible surface that the embodiments treat as starting points and ending points for routes. In practice, physical restricted stops may be bus stops, emergency lanes, fire lanes, shuttle stops, fire hydrant areas, or the like. Depending on the context, a stop may be either a pick-up location or a drop-off location for a route (whether for delivery of goods/items or people). A "pick-up" may be an event corresponding to a beginning of a route, and a pick-up location is a corresponding location. A "drop-off" may be an event corresponding to an ending of a route and a drop-off location is a corresponding location. Depending on context, these terms may refer to physical events/locations, or they may refer to computational events and road network locations of the embodiments. In practice, a physical restricted lane may be a lane of roadway whose use is restricted by local rule to one or more types of PVs, possibly with time of day (and/or day) constraints. Examples include bus lanes, HOV lanes, toll lanes, or the like. In computational contexts, restricted lanes are, by convention, portions of a road network (a digital map) designated as being available for allocating to routes provided to NPVs.

FIG. 1 shows an example of a stop utilization scenario. In the example of FIG. 1, a first NPV 100 is beginning a trip to a destination, as represented in a depiction of a road network 101 (instead, the first AV 100 might already be underway). The road network 101 includes, or has linked thereto, The NPV 100 transmits, via a wireless network 103, to a controller service 102 (see FIG. 3), a request for a route from its current location to a requested destination location. The controller service 102 searches its stored data for any restricted stops near the requested destination location. If a restricted stop is sufficiently close (e.g., within a threshold time/distance of the requested destination location), for example, a first restricted stop 104, the controller service 102 determines if allocating a route to the NPV 100 ending at the first restricted stop 104 would result in a conflict with any PVs. A set of potentially conflicting PVs is found by the controller service 102, for instance by searching its data for known active PVs with routes in the controller service's data that intersect or include the first restricted stop 104. This may include receiving real-time or near real-time location information for the PV, as well as direction, speed, and other information relative to the PV route 108 (for example, whether the PV running on time or late). The PV route 108 is part of, or linked to, the road network 101, and includes stops 109.

Assuming that a first PV 106 has a known PV route 108 that includes the first restricted stop 104, the controller service may (i) obtain an NPV route 111 for the first NPV 100, (ii) estimate an arrival time at the first restricted stop 104 for the NPV route 111, (iii) estimate an arrival time at the first restricted stop 104 for the first PV 106 according to its location and its PV route 108, (iv) determine if a time window (arrival time plus an assumed dwell duration) of the first NPV 100 would overlap with a time window of the first PV 106, and (v) if the time windows do not overlap, then the controller service 102 provides the NPV route 111 (a digital route in the digital road network 101) to the first NPV 100 and the first NPV 100 proceeds along the first NPV route to the first restricted stop 104. The controller service 102 may also record information indicating that the time window of the allocation of the first restricted stop 104, thus allowing the controller service 102 to avoid allocating the first restricted stop 104 to another NPV during the allocated time window (for example, a stop may have a designated number of maximum simultaneous NPV users). The same process may be used regardless of whether the requested stop is for a pick-up or a drop-off. Details of this process are discussed below with reference to at least FIGS. 5 and 6.

Figure 2:
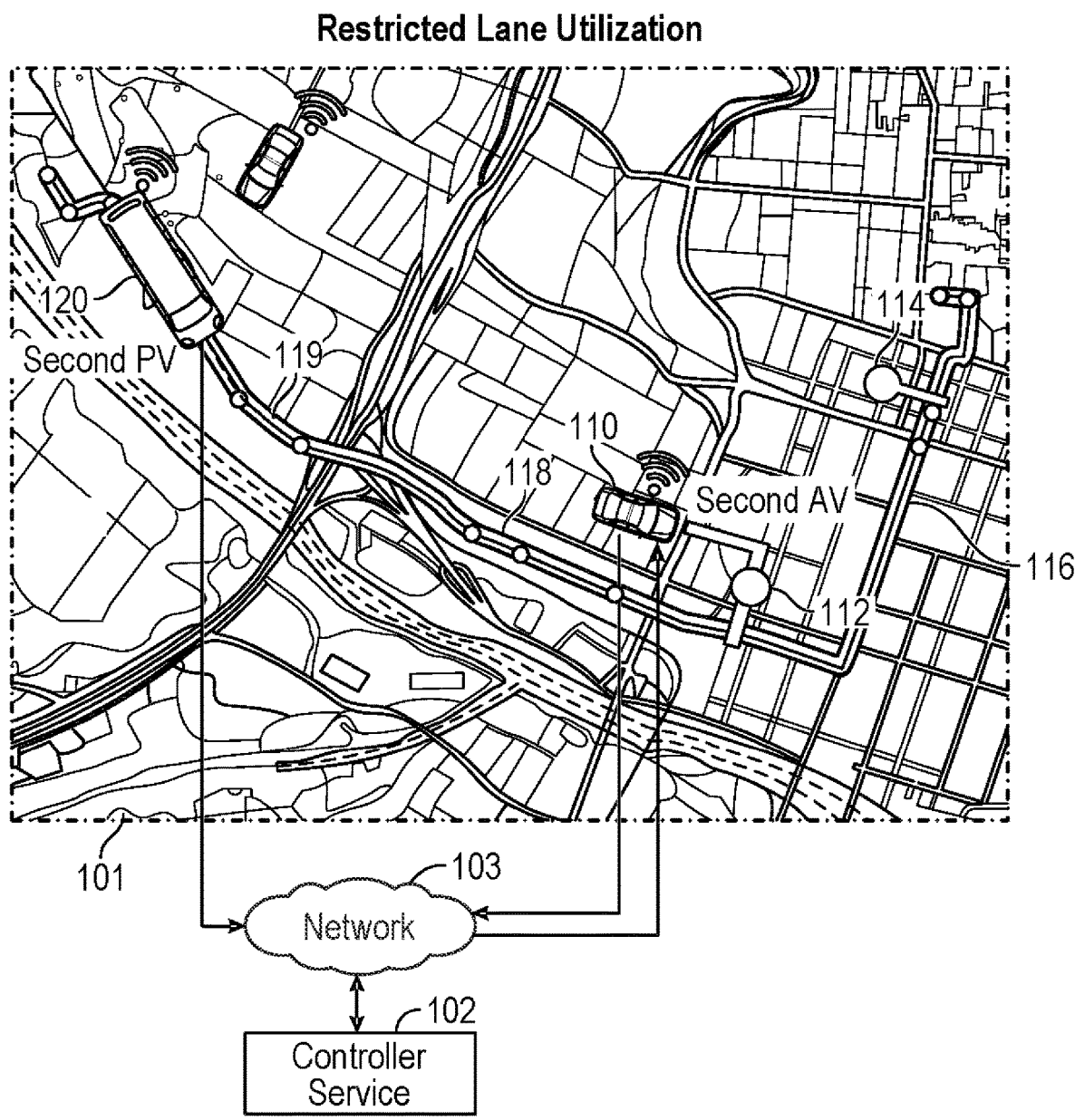
FIG. 2 shows an example of a restricted lane utilization scenario in accordance with one or more embodiments of the disclosure.

FIG. 2 shows an example of a restricted lane utilization scenario. In the example of FIG. 2, a second NPV 110 needs to make a trip from an origin to a destination. The second NPV 110 transmits to the controller service 102 a request for a route from an origin location 112 to a destination location 114. The controller service 102 generates a second NPV route 116, which is a route in the road network 101 from the from the origin location 112 to the destination location 114. The controller service 102 may track the regularly self-reported locations of PVs. The controller service 102 also has data of the routes of the PVs and which PVs are associated with which routes. Using this information, the controller service 102 can determine which restricted lanes will be in use by PVs, and when. The controller service 102 determines that the second route includes a restricted lane 118. The controller service 102 determines that a second PV 120 is on a second route 119 (dashed line in FIG. 2) that includes the restricted lane 118. The controller service 102 determines when the second NPV 110 would use the restricted lane (from the second NPV route 116 and the second NPV's 110 current location), and when the second PV 120 would use the lane (for example, from the route and location thereof). If no conflict is predicted, then the controller service 102 provides the second NPV route 116 to the second NPV 110, which proceeds accordingly. A record of the time of using the restricted lane 118 is made (which might be updated as the route is travelled). As with the restricted stop example, there may be a maximum number of NPVs allowed to concurrently use the restricted lane 118. Details of this process are discussed below with reference to at least FIGS. 7-9.

Figure 3:
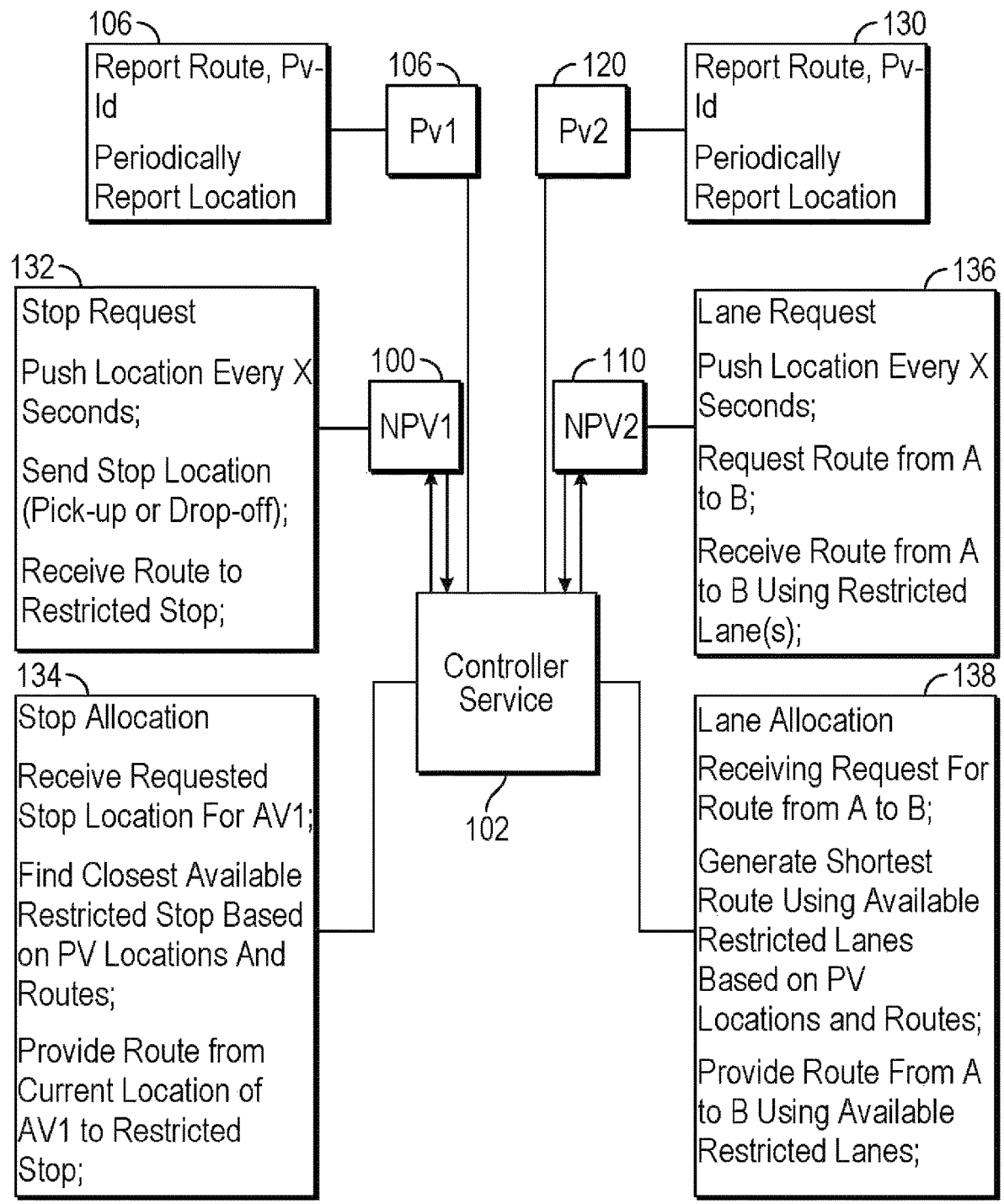
FIG. 3 shows processes for allocating restricted stops and restricted lanes in accordance with one or more embodiments of the disclosure.

FIG. 3 shows processes for allocating restricted stops and restricted lanes. The left side of FIG. 3 relates to allocating restricted stops and the right side relates to allocating restricted lanes. The first PV 106 and the second PV 120 may perform a process 130 of reporting to the controller service 102 their routes and identifier (PV-ids). The first PV 106 and second PV 120 may also periodically report their locations and identifiers. Details about what information is reported may vary according to the implementation, so long as the controller service 102 is able to determine which restricted stops will be visited by which PVs, and when.

Regarding restricted stop utilization, the first NPV 100 performs a process 132 for obtaining a route potentially including a restricted stop. The first NPV 100 may send a stop location to the controller service 102, which can potentially be a restricted stop. The first NPV 100 may regularly report its identity and location, for example, every 10 seconds. The first NPV then receives the first route 110 from the controller service 102. The controller service 102 performs a process 134 for handling the request from the first NPV 100. After receiving the request, the controller service finds the closest available restricted stop per the first NPV's 100 most recent location (assuming that one is within a threshold time/distance of the requested stop location), where availability is determined based on the locations and routes of the PVs and the locations (and corresponding time windows) of the nearby restricted stops. The controller service 102 computes a route that includes the selected restricted stop and sends the route to the first NPV 100.

Regarding restricted lane utilization, the second 110 NPV 100 performs a process 136 for obtaining a route potentially including a restricted lane. The second NPV 100 may send an origin and destination for a requested route to the controller service 102, which can potentially include a restricted lane. The second NPV 110 may regularly report its identity and location, for example, every 10 seconds. The second NPV then receives the second route 116 with the restricted lane from the controller service 102. The controller service 102 performs a process 138 for handling the request from the second NPV 100. After receiving the request, the controller service finds a route based on (i) the second NPV's 110 most recent location (for computing timing) and requested origin and destination, and (ii) including any route-improving restricted lanes that are not unavailable per the routes and locations of the PVs. The controller service 102 sends the route (e.g., second NPV route 116) that includes the restricted lane to the second NPV 110, which proceeds to the route origin and then follows the route.

Figure 4:
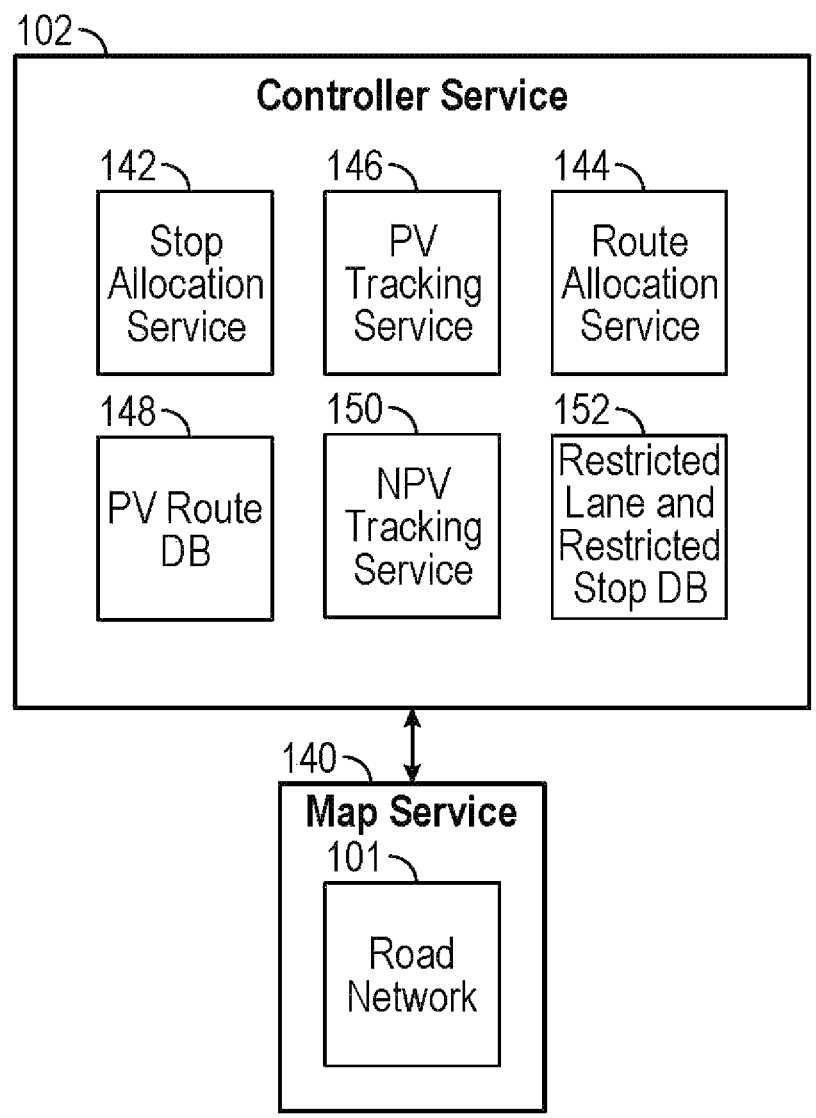
FIG. 4 shows details of a controller service in accordance with one or more embodiments of the disclosure.

FIG. 4 shows details of the controller service 102. The controller service 102 may present a single application programing interface (API) to NPVs and PVs, however, underlying base functionality (for example, data storage, map functionality) of the controller service 102 may be performed by known cloud services such as a data storage service and a map service 140 (in one embodiment, a custom map service 140 may be implemented to integrate restricted routes and lanes for route optimization). The controller service 102 includes a stop allocation service 142 (or API), which provides an interface to the NPVs for requesting and receiving permission to use restricted stops. The controller service 102 also includes a route allocation service 144 (or API), which provides an interface to the NPVs for requesting and receiving routes that potentially include restricted lanes. The controller service 102 also includes a PV tracking service 146 (or API). The PV tracking service 146 receives and stores the timestamped location updates of the PVs and associates PVs with known PV routes (for example, bus routes). The PV routes are stored in a PV route database (DB) 148 (for example, as data structures in the road network 101). Alternatively, the PV routes may be portions of the road network 101 flagged as being restricted-use. The controller service 102 includes an NPV tracking service 150 (or API) that tracks timestamped locations of the participating NPVs. The controller service may also include a restricted lane and restricted stop DB 152, which may be data structures in the road network that correspond to restricted lanes and stops. If all of the restricted lanes and stops are parts of PV routes, then the restricted lanes and stops may be stored as metadata associated with the PV routes. The restricted lane and restricted stop DB 152 may include additional data such as information about restrictions on the stops and lanes (for example, times when they are restricted but available for allocation, times when they are not available for any allocation (that is, when only PVs may use them), or times when the lanes or stops are not restricted (that is, when they are available for public use). If types of PVs are tracked (for example, buses, emergency vehicles), then rules about stop/lane availability may also be conditioned on the PV types.

Figure 5:
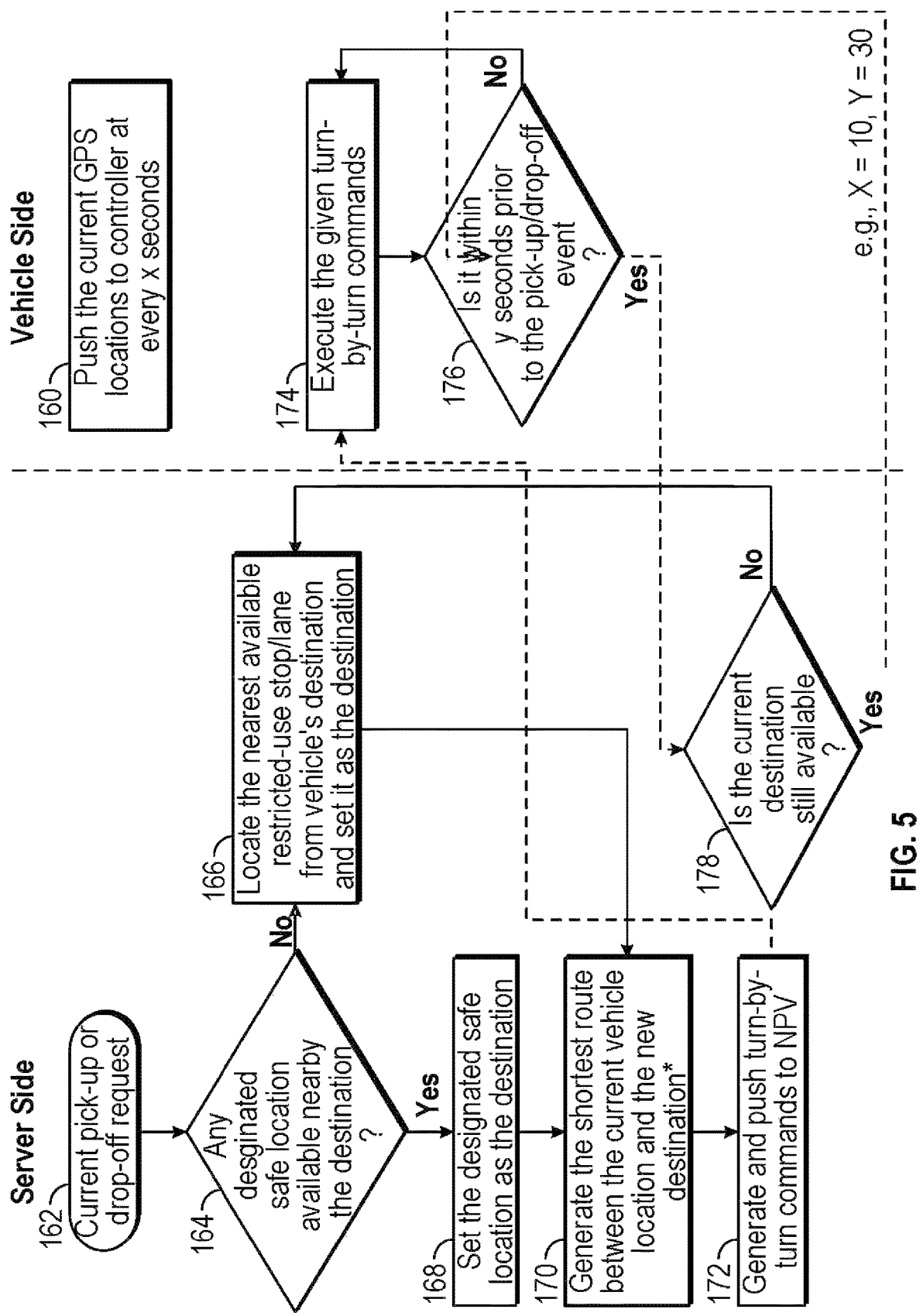
FIG. 5 shows a process for utilizing restricted stops in accordance with one or more embodiments of the disclosure.

FIG. 5 shows a process for utilizing restricted stops. On the vehicle side, at step 160 the NPVs cyclically report their location and identity. In one embodiment, vehicles may only report their location when they have submitted a request or are driving on an allocated route. At step 162 the server side receives a pick-up or drop-off request (a stop request) from an NPV. At step 164 the server side determines if there are any safe non-restricted stop locations available near the requested destination. If there are no non-restricted safe stop locations nearby, then at step 166 (see Algorithm 1.1 below) the server side locates the nearest available restricted stop location. Note that some restricted lanes may also be designated as restricted stops. At step 168, if a non-restricted safe location was available then that is set to the destination corresponding to the original stop-request. For whichever destination was selected (either a restricted or a non-restricted lane/stop), at step 170 the map service 140 generates a shortest route between the current location of the requesting NPV and the selected destination. At step 172 the route is provided to the requesting NPV, which executes the route at step 174. The route may be in the form of turn-by-turn commands, a route in the road network 101 (if compatible with the requesting NPV), etc.

To account for possible drift from the initially computed arrive-at-destination time, the server side may also perform a monitoring step 176. The monitoring step regularly updates the estimated arrive-at-destination time and, when the arrive-at-destination time is within a threshold amount of time (for example, 30 seconds), then at step 178 (see Algorithm 1.2 below) the server side checks to make sure that the destination stop is still available (at least if it is a restricted lane/stop). If it is, then the route continues. If it is not, then the process returns to step 166 and searches for a new restricted stop or lane to serve as a new destination and a new route is provided to the requesting NPV.

Algorithm 1.1, discussed below, may be used to implement step 166. Algorithm 1.1 locates a nearest available restricted stop. Again, a restricted stop may also be a restricted lane, depending on the implementation. Algorithm 1.1 may access (or implement) several services or functions. One such service queries the locations of the nearby restricted stops. Note that if restricted lanes are to be used for stops, lanes may consist of road segments rather than points, and thus each road segment may be broken down into a list of equally spaced points for finer stop-assignment granularity. That is, each segment is treated as a distinct restricted stop that is available for allocation. Algorithm 1.1 also implements or invokes a service to get the estimated vehicle travel time between two locations (this might be a function provided by the mapping service). Algorithm 1.1 also invokes or implements a service to get the next arriving RV's location and the estimated arrival time. As inputs, algorithm 1.1 receives a current location of the requesting NPV, the requested destination location, a maximum number of nearby restricted stops to query, and a safety time buffer which includes assumed loading/unloading times (the time window mentioned above). While the pseudo-code describing Algorithm 1.1 below is self-explanatory, however, to summarize, the algorithm starts with k candidate nearby restricted stops returned by the above-mentioned service. The algorithm iterates over the stops and returns the stop that is both closest and available (not conflicting).

Algorithm 1.1:

Algorithm 1.1: Locate the nearest available PV stop / lane from vehicle's destination and set it as the destination
Require:
    · A service to query the locations of the nearby PV stops / AV lanes**
    · A service to get the estimated vehicle travel time between two locations
    · A service to get the next arriving PV's location and the estimated arrival time of the next arriving PV associated with the given PV stop
Input:
    · p: the current GPS location of the given vehicle
    · d: GPS location of the vehicle's destination
    · k: a parameter to set the maximum number of nearest PV stops to query
    · $t_s$: safety time buffer which includes loading or unloading times
Output:
    · d: the location of the nearest available PV-stop from the given vehicle as the new destination
    · i: index as an identifier of the nearest available PV-stop from the given vehicle
Initialize: isAvailable = False, i = 1
// get an ordered set of Locations of up to k-nearest PV stops or Lanes
// from the location of the vehicle's destination d, ordered by the
// nearest to the k*-th nearest where (k* ≤ k)

Algorithm 1.1:

$(q_1,...,q_k*) \leftarrow$ getKNearestSafeLocation(d,k)
While isAvailable = False and i ≤ k* do
    // get the estimated vehicle travel time from point p to point $q_i$
    $t_v \leftarrow$ getEstimatedVehicleTravelTime(p, $q_i$)
    // get the next inbound PV Location associated with the given the i-th
    // PV stop
    $p_{in} \leftarrow$ getNextArrivingPVLocation(i, $q_i$)
    // get the next arriving PV's estimated arrival time associated with the
    // given the i-th PV stop; here, the dwell (stay at PV stop) time
    // should be included besides the PV's travel time
    $t_b \leftarrow$ getEstimatedPVArrivalTime ($q_i$, $p_{in}$)
    // check if the given PV stop can be used, see d
    If $t_b > t_v + t_s$ then
        isAvailable = True
        Return d ← $q_i$, i
    Else
        i ← i + 1
    End If
End While
Return NULL Regarding the double asterisked "PV lanes**" above, note that each PV lane may consist of road segments, not points, and thus each road segment can be broken down into a list of equally-spaced points for better time efficiency.

Figure 6:
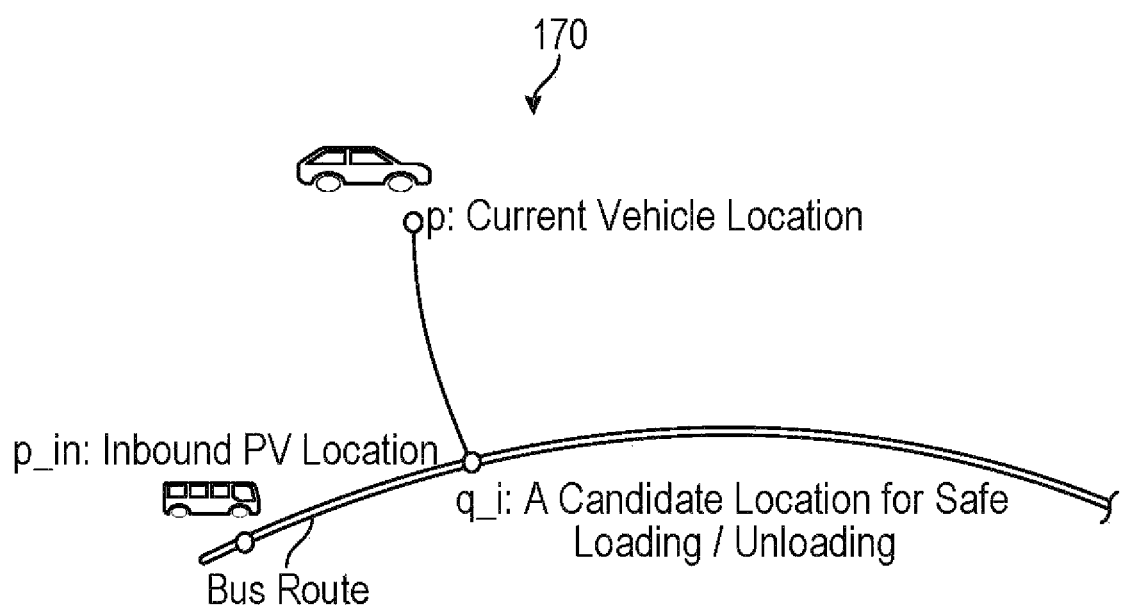
FIG. 6 illustrates parameters of algorithm that finds a nearest available stop or lane in accordance with one or more embodiments of the disclosure.

FIG. 6 illustrates parameters 170 of the algorithm shown in FIG. 6. As discussed above, Algorithm 1.1 tests candidate stops (q_i) to find a closest stop that is not pre-empted by a PV.

Algorithm 1.2, discussed below, may be used to implement step 178 shown in FIG. 5. As noted above, step 178 (Algorithm 1.2) determines whether a current stop is still available when the requesting NPV is approaching the stop. Algorithm 1.2 uses a service to get the estimated vehicle travel time between two locations and another service to get the next arriving PV's location and the estimated arrival time associated with respect to the given location. As input it receives the current location of the given NPV, the location of the given available stop, and a safety time buffer which includes loading or unloading times (the aforementioned time window). Algorithm 1.2 outputs a flag indicating whether the relevant stop is still available to use or not (perhaps by way of an intermediary service). If the estimated time for the NPV to reach the stop falls outside the window of the PV's estimated time of arrival, then the algorithm returns a flag that the stop is still available.

Algorithm 1.2:

Algorithm 1.2: Is the Current PV Stop Still Available to Use?
Require:
    · A service to get the estimated vehicle travel time between two
      locations
    · A service to get the next arriving PV's location and the estimated
      arrival time associated with respect to the given location
Input:
    · p: the current location of the given vehicle
    · $q_i$: location of the given available PV stop where i is the index of
      the PV stop used as an identifier
    · $t_s$: safety time buffer which includes loading or unloading times
Output:
    · isAvailable: whether the PV stop is still available to use or not
      as a Boolean
Initialize: isAvailable = False
// get the estimated vehicle travel time from point p to point $q_i$
$t_v \leftarrow$ getEstimatedVehicleTravelTime(p,$q_i$)
// get the next arriving PV Location associated with the given the i-th PV
// stop
$p_{in} \leftarrow$ getNextArrivingPVLocation (i, $q_i$)

Algorithm 1.2:

// get the next arriving PV's estimated arrival time associated with the
// given the i-th PV stop; here, the dwell (stay at PV stop) time should be
// included besides the PVs travel time
$t_b \leftarrow$ getEstimatedPVArrivalTime ($q_i$, $p_{in}$)
// check if the given PV stop can be used
If $t_v > t_b + t_s$ then
    isAvailable = True
End If
Return isAvailable Both Algorithm 1.1 and Algorithm 1.2 may be partitioned into day parts to account for variations throughout a day caused by, for instance, traffic patterns, weather, etc.

Figure 7:
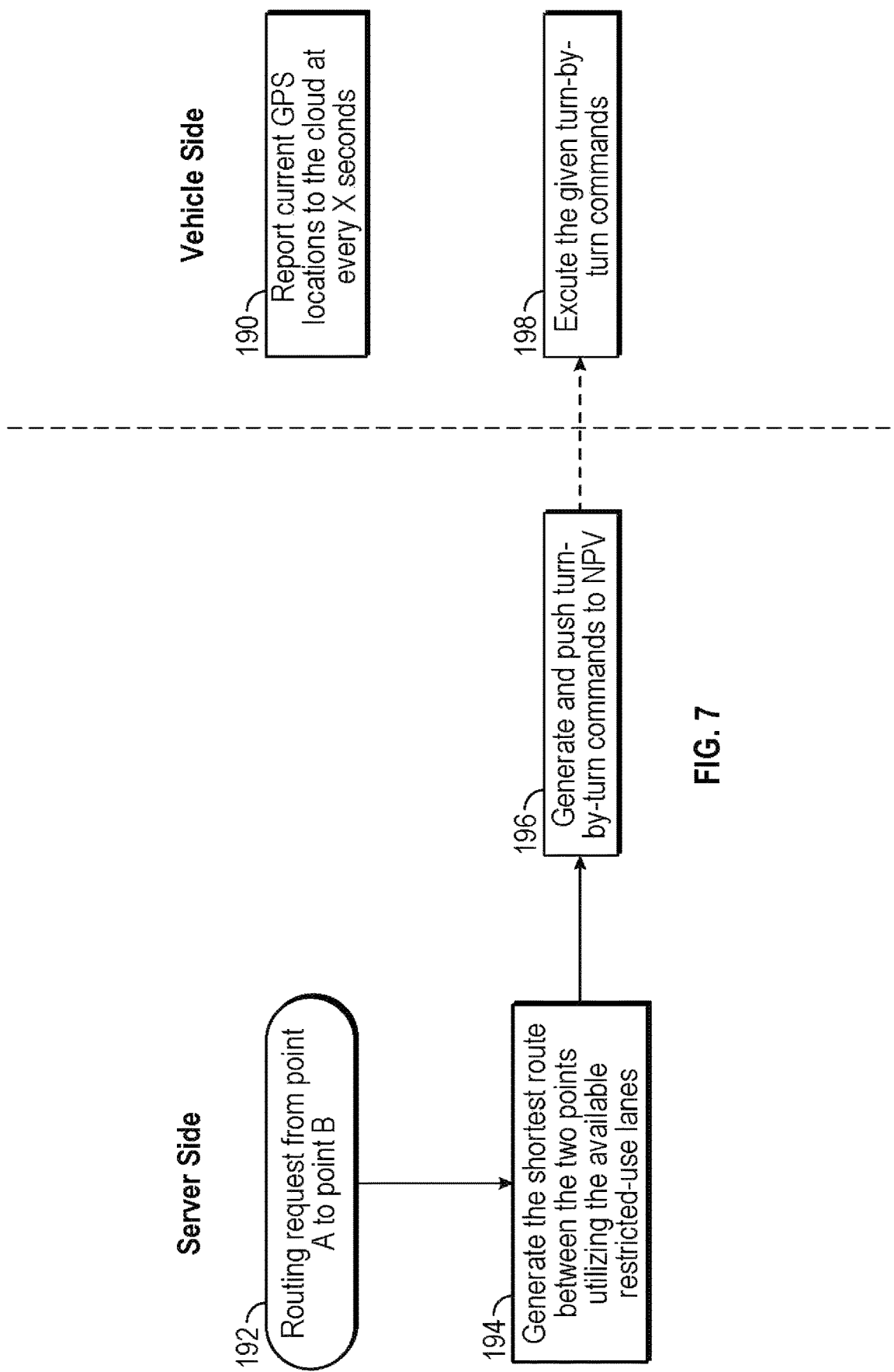
FIG. 7 shows a process for utilizing restricted lanes in accordance with one or more embodiments of the disclosure.

FIG. 7 shows a process for utilizing restricted lanes. At step 190, a requesting NPV may periodically report its identity and location to the server side. Step 190 may be performed at any time the NPV is operating or it may be performed starting when a new route is requested. At step 192 the server side receives the request and the identity of the requesting NPV. At step 194 the server side generates a shortest route between the requested destination and origin, taking into account any restricted lanes that are available for the route. In one embodiment, a route may be found sending a route request to the mapping service, while indicating which lanes are currently unavailable to the requesting vehicle, and the mapping service finds a route as like any other routing service, but with otherwise-restricted lanes available for inclusion in the calculated route. At step 196 the server side generates turn-by-turn commands and sends them to the requesting NPV, in effect controlling the NPV (in the case of an actual autonomous vehicle). In other embodiments, the server side returns a route that the NPV itself can interpret into driving instructions. At step 198 the NPV executes the route provided by the server side.

Algorithm 2, discussed below, may be used to implement step 194 shown in FIG. 7. In one embodiment, Algorithm 2 is performed by the mapping service. The algorithm accesses the currently unavailable and available restricted lanes respective sets of road segments. The unavailable lanes can be obtained based on several factors related to traffic load, e.g., per unit time traffic volume on the given road segment (for example, 10 cars during 1 min over the given road segment); if the traffic volume on the given road is higher than the upper limit value, then the road is added to the set of unavailable lanes; otherwise, it is added to the set of available lanes. Note that such busy roads from the unavailable set should not be used to ensure the quality of the existing PV/bus service services (for example, customer wait/travel time from the RV). The algorithm uses a service to get estimated vehicle travel time between two locations, and a service to get the next arriving PV's location and the estimated arrival time associated with respect to the given location. As input, the algorithm is passed a weighted directed graph that represents the road network. The algorithm also receives the origin, destination, and current time.

The algorithm iterates over the edges in the graph. Unavailable edges (e.g., restricted lanes occupied by RVs) are effectively removed from the graph. If an edge is in the set of available lanes, then the following steps occur. The travel time between the requested trip origin and the head of the current edge is computed. This, travel time, along with the current time, the edge, and the origin are used to get the nearest of the PV inbound to the edge/lane segment. NPV and PV travel times are derived and based thereon it is determined if use of the current edge/lane by the NPV would be in conflict with use by the PV, and if so, the edge/lane is removed from the graph. The revised graph, time, origin, and destination are used to compute the algorithm's output, which is the shortest route from the origin to the destination using any available restricted lanes if they shorten the route.

---

Algorithm 2:

Algorithm 2: Generate the shortest route between the two points utilizing the available DBLs / HOV Lanes
Require:
 · U: the unavailable PV routes as a set of road segments
 · W: the available PV routes as a set of road segments
 · A service to get the estimated vehicle travel time between two locations
 · A service to get the next arriving PV's location and the estimated arrival time associated with respect to the given location
Input:
 · G(V, E, A): a weighted directed graph G representing the road network with vertex set V, edge set E ∈ V × V, and the adjacency
  matrix A, where the (i, j)-th element of the matrix A corresponds to the weight assigned to the edge (i,j) from i-th vertex to j-th vertex
 · $p_a$: GPS location of the given point a
 · $p_b$: GPS location of the given point b
 · t: current time
Output:
 · R: the shortest route between two points utilizing only the available PV routes
For e ∈ E do
 If e is in ∪ then
  // remove edge by assigning zero-weight to the edge corresponding to
  // unavailable roads where $w_e$ is the weight associated with the edge e
  $w_e$ ← 0
 Else if e ∈ W then
  // get location of head and tail of the edge e
  $e_{head}$, $e_{tail}$ ← getHeadTailFromEdge(e)
  // get AV travel time between $p_a$ and $e_{head}$ at time t
  $dt_0$ ← getAVTravelTime ($p_a$, $e_{head}$, t)
  // get the nearest location of the PV inbound to the road segment e
  // after $dt_0$ from t
  $p_{in}$, $p_{out}$, dt ← getInAndOutPVLocations(e, $p_a$, t + $dt_0$)
  // get AV travel time between $e_{head}$ and $e_{tail}$ after $dt_0$ from t
  $dt_1$ ← getAVTravelTime($e_{head}$, $e_{tail}$, t + $dt_0$)
  // get PV travel time between $p_{in}$ and $e_{tail}$ after $dt_0$ from t
  $dt_2$ ← getPVTravelTime($p_{in}$, $e_{tail}$, t + $dt_0$)
  // get PV travel time between $p_{out}$ and $e_{tail}$ after $dt_0$ from t
  $dt_3$ ← getPVTravelTime ($p_{out}$, $e_{tail}$, t + $dt_0$)
  // See Figure 9 for an illustrative example to test this condition
  If $dt_1$ > $dt_2$ or $dt_1$ < $dt_3$ then
   $w_e$ ← 0
  End If
 End If
End For
// this calculates the shortest route from $p_a$ to $p_b$ where $p_a$, $p_b$ are two
vertices from the given weighted directed graph G(V,E,A)
return R = getShortestRoute (G,$p_a$,$p_b$,t)

---

Note that the cost for an NPV using the DBLs/HOV lanes can be calculated based on the number of times each lane was used, travel length, and each travel time.

Figure 8:
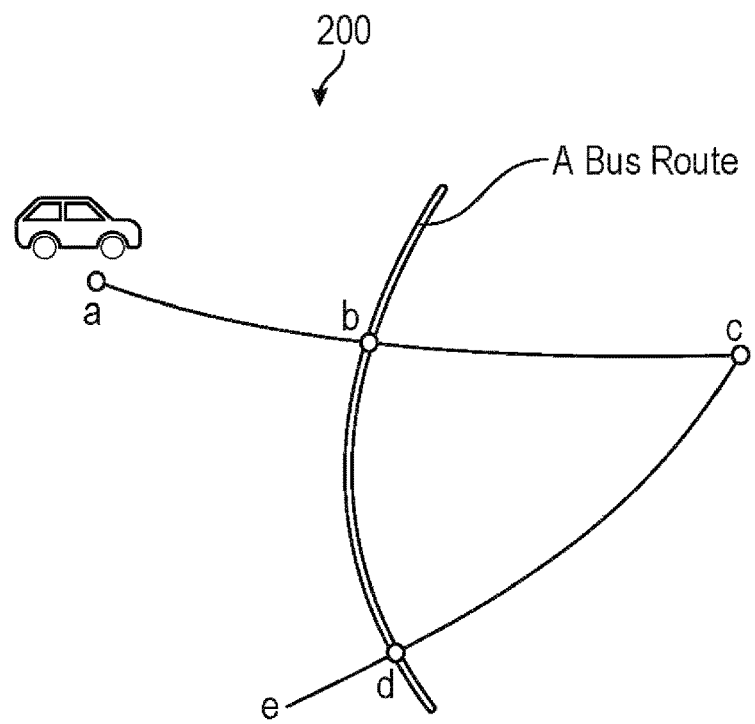
FIG. 8 illustrates logic of an algorithm that finds a shortest route between two points in accordance with one or more embodiments of the disclosure.
Figure 9:
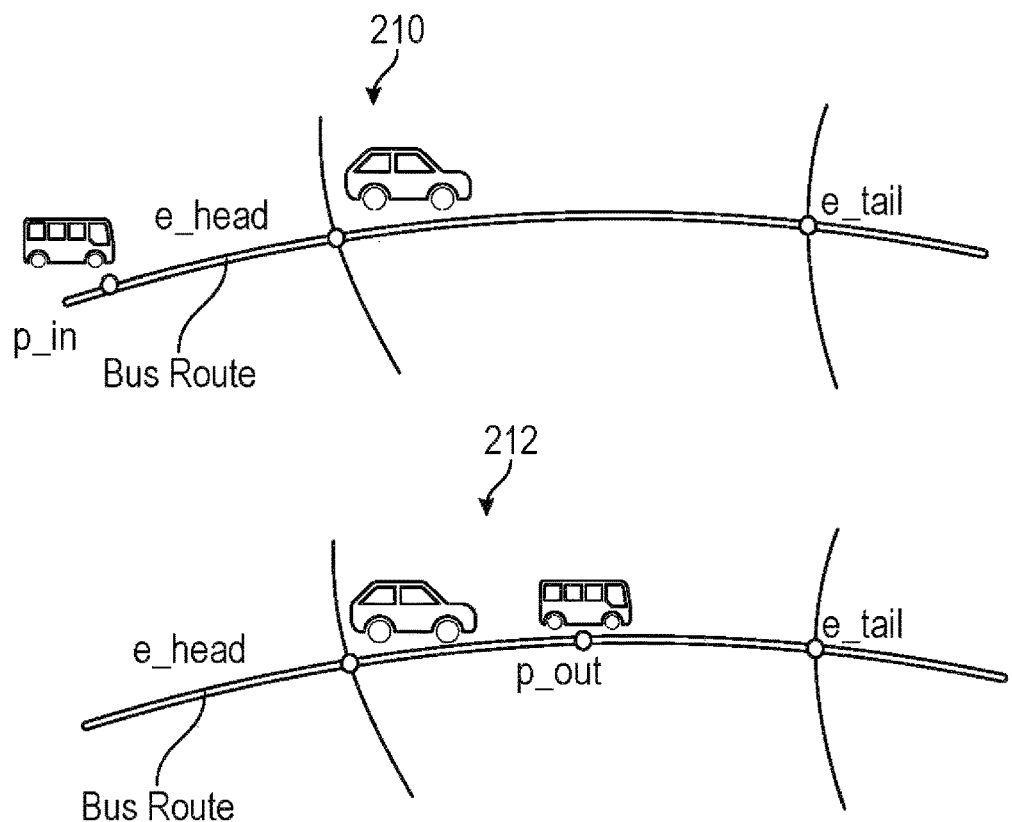
FIG. 9 illustrates additional logic of the algorithm that finds a shortest route between two points in accordance with one or more embodiments of the disclosure.

FIG. 8 illustrates some of the logic of Algorithm 2. Supposed that an NPV located at point "a" wants to travel to "e" via the given road network. If the given restricted lane is under "heavy" traffic, Algorithm 2 will remove the arc b-d. Without further constraints, the desired route in this case should be a-b-c-d-e. FIG. 9 illustrates additional logic of Algorithm 2. Suppose that an NPV located at point "e_head" wants to travel to "e_tail" via utilizing the given restricted lane (e.g., bus route), and there are two RVs (e.g., buses) nearby, one is inbound, and one is outbound. Algorithm 2 will further remove the restricted lane from consideration based on the relative difference in the effective travel times between the NPV and the PV/bus. Regarding the upper condition 210, for an inbound RV/bus: if the estimated NPV travel time from e_head to e_tail (dt_1) is greater than the estimated bus travel time from pin to e_tail (dt_2), Algorithm 2 will remove the are e_head-e_tail. Regarding the lower condition 212, for an outbound RV/bus: if the estimated NPV travel time from e_head to e_tail (dt_1) is smaller than the estimated RV/bus travel time from p_out to e_tail (dt_3), Algorithm 2 will remove the are e_head-e_tail.

Regarding stop allocation as discussed above, it is possible that the controller service 102 returns just an allocated restricted stop and lets the requesting NPV determine its own routing. However, some adjustments would be needed to maintain ongoing coordination between any RVs and the NPV.

While stop and lane allocation are discussed separately above, it should be apparent that the two techniques can be readily combined. For example, a stop provided by the stop allocation method can serve as a destination or origin for the lane allocation method.

The division of functionality between vehicles and cloud services discussed is somewhat arbitrary. Any architecture that effectuates the functionality will suffice.

Discussion herein of vehicles performing computational steps, providing locations, receiving routes, and the like, should be understood to be shorthand that refers to operations performed by on-board computers of the vehicles or mobile devices traveling within the vehicles.

Embodiments discussed above may be implemented with a financial component. A governmental entity that owns roads and other infrastructure may charge fees for use of the restricted stops and lanes as discussed above. For example, when a NPV uses a bus stop, the controller service may charge an account associated with the NPV. When the controller allocates an NPV to use a restricted lane, the NPV may be charged using automated tolling facilities. A service interface may be provided to allow ridesharing services to request use of infrastructure and, in conjunction with granting such requests, charge the ridesharing services.

Embodiments discussed above may be used for any type of transportation business. For example, NPVs may be part of a ridesharing fleet. NPVs may be vehicles delivering packages. For example, when a delivery vehicle or ridesharing vehicle needs to make a dropoff or delivery to a given location, the delivery vehicle or ridesharing vehicle may request and be allocated a restricted stop or lane for the dropoff or delivery.

Figure 10:
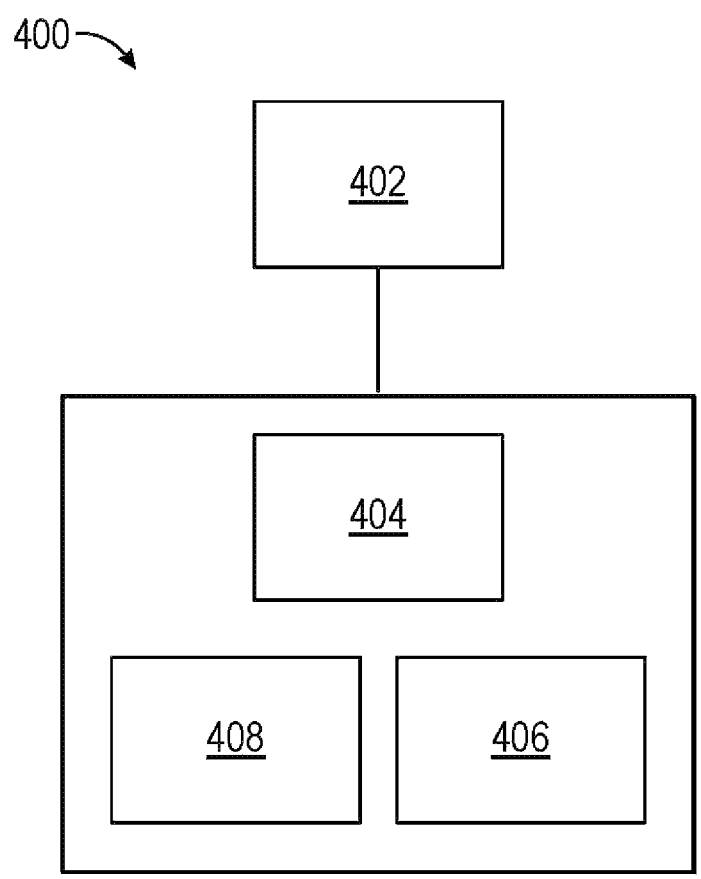
FIG. 10 shows details of a computing device in accordance with one or more embodiments of the disclosure.

FIG. 10 shows details of a computing device 400, one or more of which may execute the applications, services, and functions discussed above, such as controller service 102 and vehicle-side software. The technical disclosures herein will suffice for programmers to write software, configure cloud services, and/or configure reconfigurable processing hardware (e.g., field-programmable gate arrays (FPGAs)), and/or design application-specific integrated circuits (ASICs), etc., to run on the computing device 400 to implement any of the features or embodiments described herein.

The computing device 400 may have one or more displays 402, a network interface 404 (or several), as well as storage hardware 406 and processing hardware 408, which may be a combination of any one or more: central processing units, graphics processing units, analog-to-digital converters, bus chips, FPGAs, ASICs, Application-specific Standard Products (ASSPs), or Complex Programmable Logic Devices (CPLDs), etc. The storage hardware 406 may be any combination of magnetic storage, static memory, volatile memory, non-volatile memory, optically or magnetically readable matter, etc. The meaning of the term "computer-readable storage hardware", as used herein does not refer to signals or energy per se, but rather refers to physical apparatuses and states of matter. The hardware elements of the computing device 400 may cooperate in ways understood in the art of machine computing. In addition, input devices may be integrated with or in communication with the computing device 400. The computing device 400 may have any form-factor or may be used in any type of encompassing device.

In the above disclosure, reference has been made to the accompanying drawings, which form a part hereof, which illustrate specific implementations in which the present disclosure may be practiced. It is understood that other implementations may be utilized, and structural changes may be made without departing from the scope of the present disclosure. References in the specification to "one embodiment," "an embodiment," "an example embodiment," "an example embodiment," etc., indicate that the embodiment described may include a particular feature, structure, or characteristic, but every embodiment may not necessarily include the particular feature, structure, or characteristic. Moreover, such labels or phrases are not necessarily referring to the same embodiment. Further, when a particular feature, structure, or characteristic is described in connection with an embodiment, one skilled in the art will recognize such feature, structure, or characteristic in connection with other embodiments whether or not explicitly described.

While various embodiments of the present disclosure have been described above, it should be understood that they have been presented by way of example only, and not limitation. It will be apparent to persons skilled in the relevant art that various changes in form and detail can be made therein without departing from the spirit and scope of the present disclosure. Thus, the breadth and scope of the present disclosure should not be limited by any of the above-described example embodiments but should be defined only in accordance with the following claims and their equivalents. The foregoing description has been presented for the purposes of illustration and description. It is not intended to be exhaustive or to limit the present disclosure to the precise form disclosed. Many modifications and variations are possible in light of the above teaching. Further, it should be noted that any or all of the aforementioned alternate implementations may be used in any combination desired to form additional hybrid implementations of the present disclosure. For example, any of the functionality described with respect to a particular device or component may be performed by another device or component. Further, while specific device characteristics have been described, embodiments of the disclosure may relate to numerous other device characteristics. Further, although embodiments have been described in language specific to structural features and/or methodological acts, it is to be understood that the disclosure is not necessarily limited to the specific features or acts described. Rather, the specific features and acts are disclosed as illustrative forms of implementing the embodiments. Conditional language, such as, among others, "can," "could," "might," or "may," unless specifically stated otherwise, or otherwise understood within the context as used, is generally intended to convey that certain embodiments could include, while other embodiments may not include, certain features, elements, and/or steps. Thus, such conditional language is not generally intended to imply that features, elements, and/or steps are in any way required for one or more embodiments.

The invention claimed is:

1. A method performed by a controller service presenting a single application programming interface, the method comprising:
   receiving a request from a non-priority vehicle (NPV), the request comprising a stop location;
   based on the requested stop location, determining a restricted stop associated with the stop location, the restricted stop comprising a location in a road network;
   based on: a) a location of a priority vehicle (PV); b) whether the PV is running late; c) whether a time window which comprises an arrival time of the NPV plus an assumed dwell duration of the NPV would overlap with a time window of the PV; d) a designated number of maximum simultaneous NPV users associated with the restricted stop; and e) an absence of non-restricted safe stop locations near the stop location, determining to allocate the restricted stop to the NPV, the determination based on a determination that use of the restricted stop by the NPV according to a location of the NPV will not conflict with operation of the PV, wherein the PV is an emergency vehicle a utility vehicle, a garbage truck, a police vehicle, or an ambulance, and wherein the NPV is one of a plurality of ridesharing vehicles, one of a plurality of fleet vehicles, or one of a plurality of delivery vehicles none of which comprise the PV;
   sending, to the NPV, an indication that the restricted stop is available;
   either computing a route, in the road network, to the location of the restricted stop, or allowing the NPV to determine its own route to the restricted stop;
   if computing the route, sending an indication of the route to the NPV, and in response, automatically charging a service provider associated with the NPV;
   accessing a database of restricted lanes and restricted stops in the road network;
   storing non-priority identifiers identifying non-priority vehicles (NPVs) and priority identifiers identifying priority vehicles (PVs), the identifiers corresponding to a distance to the restricted stop;
   receiving locations from the NPVs and the PVs and storing the locations in association with the corresponding identifiers, wherein a route in the road network is computed based on the locations of the NPVs and the PVs; and
   wherein the restricted stops comprise smart traffic lights.

2. The method according to claim 1, wherein the NPVs comprise autonomous vehicles, wherein the PV is the emergency vehicle corresponding to the restricted stop having first rules for a first availability, the utility vehicle corresponding to the restricted stop having second rules for a second availability, the garbage truck corresponding to the restricted stop having third rules for a third availability, the police vehicle corresponding to the restricted stop having fourth rules for a fourth availability, or the ambulance corresponding to the restricted stop having fifth rules for a fifth availability, and wherein the first, second, third, fourth, and fifth rules are all different from one another.

3. The method according to claim 1, wherein the restricted stops further comprise bus stops, loading zones, areas reserved for fire or police, fire hydrant zones, airports areas, shuttle areas, or trolly lanes, and wherein the method comprises allowing the NPV to determine its own route to the restricted stop without sending an indication of the route to the NPV and automatically charging the service provider.

4. The method according to claim 1, further comprising:
receiving a request from a second NPV, the request comprising an origin location and a destination location; and
generating a route in the road network from the origin location to the destination location, wherein the generating is based on a location of a second PV and a location of the second NPV.

5. The method according to claim 1, wherein the generating the route comprises determining to include in the route a lane determined to be restricted, wherein the determining to include the lane is based on determining that the lane determined to be restricted is used by a second NPV, and wherein the location of the PV used as a basis to allocate the restricted stop is a real-time location of the PV.

6. The method according to claim 5, wherein the determining whether to include the lane in the route is based on a travel time of the second NPV relative to the lane and is based on a travel time of the second PV relative to the lane.

7. Computer-readable storage hardware storing instructions that, when executed by a controller service presenting a single application programming interface, perform a process, the process comprising:
receiving a request from a non-priority vehicle (NPV), the request comprising an origin location and a destination location;
based on (i) the requested origin location and destination location, (ii) a location of a priority vehicle (PV), (iii) a location of the NPV, (iv) an indication of a restricted stop, (v) whether the PV is running late, (vi) whether a time window which comprises an arrival time of the NPV plus an assumed dwell duration of the NPV would overlap with a time window of the PV, (vii) a designated number of maximum simultaneous NPV users associated with the restricted stop, and (viii) an absence of non-restricted safe stop locations near the stop location, generating a route in a road network from the origin location to the destination location, the route including the restricted stop, wherein the PV is an emergency vehicle, a utility vehicle, a garbage truck, a police vehicle, or an ambulance, and wherein the NPV is one of a plurality of ridesharing vehicles, one of a plurality of fleet vehicles, or one of a plurality of delivery vehicles none of which comprise the PV; and
providing to the NPV the generated route or driving instructions derived therefrom;
either computing a route, in the road network, to the location of the restricted stop, or allowing the NPV to determine its own route to the restricted stop;
if computing the route, sending an indication of the route to the NPV, and in response, automatically charging a service provider associated with the NPV;
accessing a database of restricted lanes and restricted stops in the road network;
storing non-priority identifiers identifying non-priority vehicles (NPVs) and priority identifiers identifying priority vehicles (PVs), the identifiers corresponding to a distance to the restricted stop; and
receiving locations from the NPVs and the PVs and storing the locations in association with the corresponding identifiers, wherein a route in the road network is computed based on the locations of the NPVs and the PVs;
wherein the restricted stops comprise smart traffic lights.

8. The computer-readable storage hardware according to claim 7, wherein the restricted-use lanes and the restricted-use stops in the database represent restricted-use road lanes and restricted-use areas in a metropolitan area corresponding to the road network, wherein the PV is the emergency vehicle corresponding to the restricted stop having first rules for a first availability, the utility vehicle corresponding to the restricted stop having second rules for a second availability, the garbage truck corresponding to the restricted stop having third rules for a third availability, the police vehicle corresponding to the restricted stop having fourth rules for a fourth availability, or the ambulance corresponding to the restricted stop having fifth rules for a fifth availability, and wherein the first, second, third, fourth, and fifth rules are all different from one another.

9. The computer-readable storage hardware according to claim 8, wherein the restricted lanes correspond to high-occupancy vehicle lanes or bus lanes in the metropolitan area, and wherein the restricted stops further comprise bus stops, loading zones, areas reserved for fire or police, fire hydrant zones, airports areas, shuttle areas, or trolly lanes in the metropolitan area, and wherein the process comprises allowing the NPV to determine its own route to the restricted stop without sending an indication of the route to the NPV and automatically charging the service provider.

10. The computer-readable storage hardware according to claim 7, the process further comprising:
receiving a second request from a second NPV, the second request comprising a stop location associated with the second NPV;
finding a stop determined to be a restricted-use stop and also determined to be within a threshold distance of the requested stop location; and
based on a location of the second NPV, a location of a second PV, and a location of the found stop, determining whether to allocate the found stop location to the second NPV.

11. The computer-readable storage hardware according to claim 10, the process further comprising generating a route to the found restricted stop location and providing to the second NPV the route or driving instructions corresponding thereto.

12. The method according to claim 1, wherein the PV is a police vehicle or an ambulance.

13. The method according to claim 1, wherein the PV is a utility vehicle or a garbage truck.

14. The computer-readable storage hardware according to claim 7, wherein the PV is a police vehicle or an ambulance.

15. The computer-readable storage hardware according to claim 7, wherein the PV is a utility vehicle or a garbage truck.

16. The method according to claim 1, wherein the PV is the emergency vehicle corresponding to the restricted stop having first rules for a first availability, the utility vehicle corresponding to the restricted stop having second rules for a second availability, the garbage truck corresponding to the restricted stop having third rules for a third availability, the police vehicle corresponding to the restricted stop having fourth rules for a fourth availability, or the ambulance corresponding to the restricted stop having fifth rules for a fifth availability, and wherein the first, second, third, fourth, and fifth rules are all different from one another, and wherein the method comprises allowing the NPV to determine its own route to the restricted stop without sending an indication of the route to the NPV and automatically charging the service provider.

17. The computer-readable storage hardware according to claim 7, wherein the PV is the emergency vehicle corresponding to the restricted stop having first rules for a first availability, the utility vehicle corresponding to the restricted stop having second rules for a second availability, the garbage truck corresponding to the restricted stop having third rules for a third availability, the police vehicle corresponding to the restricted stop having fourth rules for a fourth availability, or the ambulance corresponding to the restricted stop having fifth rules for a fifth availability, and wherein the first, second, third, fourth, and fifth rules are all different from one another, and wherein the method comprises allowing the NPV to determine its own route to the restricted stop without sending an indication of the route to the NPV and automatically charging the service provider.

* * * * *